June 2, 1925. 1,540,055
H. J. CHILTON
NUT AND BOLT STRUCTURE
Filed Sept. 5, 1922
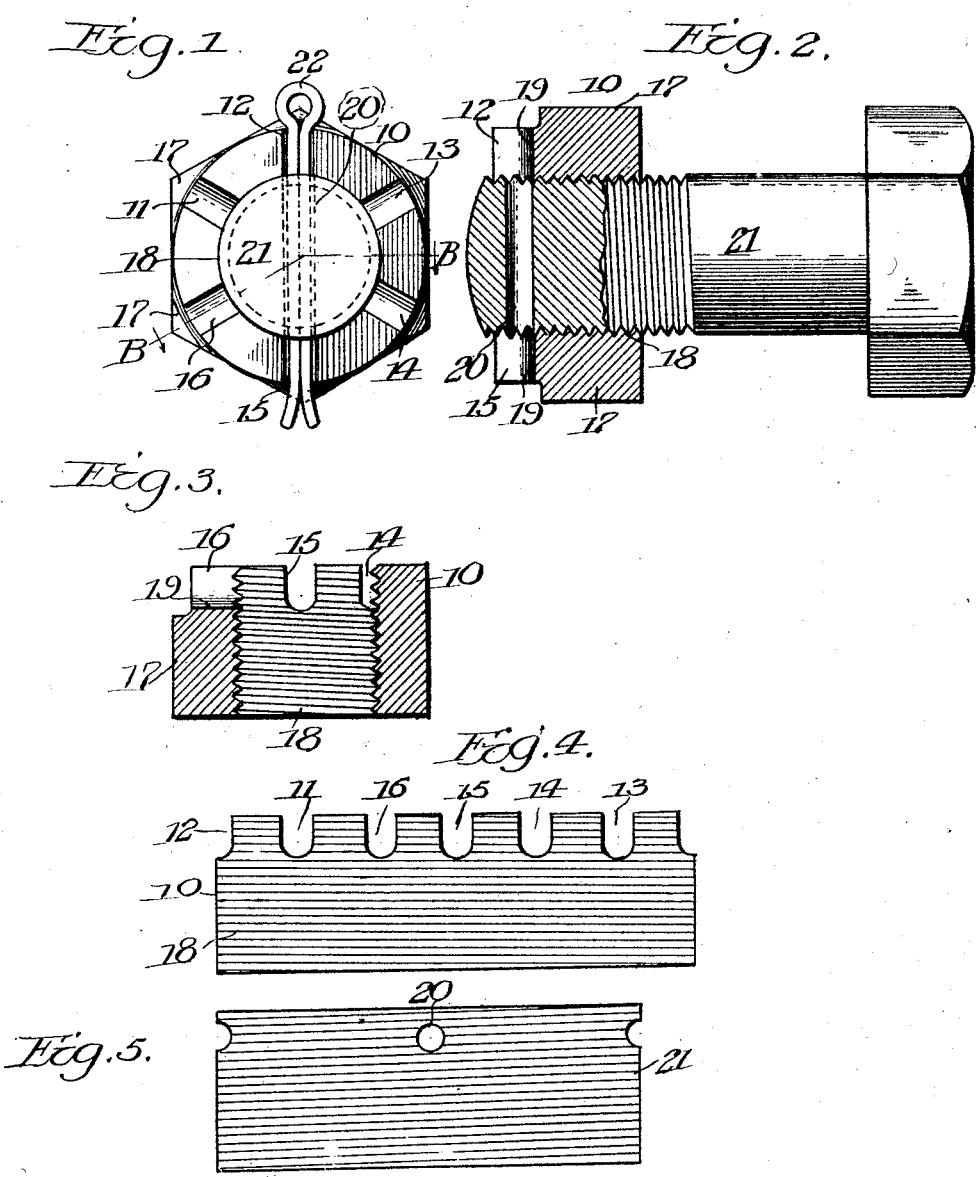
INVENTOR
Henry J. Chilton
BY
Otto M. Wermick
ATTORNEY Patented June 2, 1925.

1,540,055

UNITED STATES PATENT OFFICE.

HENRY J. CHILTON, OF CHICAGO, ILLINOIS.

NUT AND BOLT STRUCTURE.

Application filed September 5, 1922. Serial No. 586,087.

*To all whom it may concern:*

Be it known that I, HENRY J. CHILTON, a citizen of the United States, residing at Chicago, in the county of Cook and State of Illinois, have invented a certain new and useful Improvement in Nut and Bolt Structures, of which the following is a full, clear, concise, and exact description, reference being had to the accompanying drawings, forming a part of this specification.

This invention relates to nut and bolt structures of the well-known and extensively used type employing a castle nut with a cotter pin lying in the slots of the nut and passed through a transverse hole in the bolt to lock the nut on the bolt in various adjusted positions.

The main purpose of the invention, briefly stated, is to provide a construction of this type which shall effect a substantial economy of material in both the bolt and nut and particularly the latter, and a consequent reduction in the cost of production as compared with the standard constructions now known and used, without any sacrifice of the strength of the nut to resist rupture of the wall thereof.

In the manufacture of castle nuts which are used with a cotter-pin passed through a transverse hole in the bolt and are capable of a limited degree of adjustment lengthwise of the latter while preserving the locking feature, it has heretofore been the universal practice to add to all standard sizes of nuts an integral circular wall or flange on the outer face of the nut and to slot this wall or flange in planes which bisect the wall of the nut midway between the corners of the polygonal periphery which are the thinnest, and consequently the weakest, regions of the wall. I have discovered that this circular wall or flange, as an addition to the standard nut itself, may be wholly dispensed with, and a nut of equal strength to resist rupture produced by slotting the face of a standard nut in planes which bisect the wall of the nut at the corners of the polygonal periphery, which are the thickest, and consequently the strongest, regions of the wall and to a depth sufficient to afford the usual adjustments of the nut lengthwise of the bolt and the locking of the same by the cotter-pin; which slotted portion may also be turned down to the depth of the slots to provide a circular wall or flange corresponding in form to that of the standard castle nut, and to permit the use of the standard length of cotter-pin, without any sacrifice of strength.

Just as a chain is no stronger than its weakest link, so a nut is no stronger than the smallest transverse area of its wall; and where a nut is slotted in a plane bisecting the thinnest region or regions of its wall to receive the cotter-pin as in the present practice, the nut is manifestly weakened at is weakest point or points, and consequently the nuts must have sufficient length or depth to stand such weakening. But if the nut be slotted in a plane bisecting its thickest region or regions, which are at the corners, I have found that the slots may be made of ample depth to receive the cotter-pin with capacity for the usual degree of adjustment, and still leave at these points transverse wall areas no smaller, and consequently no weaker, than the transverse areas extending the full length or depth of the nut at the thinnest portions of the wall, and it is this that enables the production of a castle nut of considerably less length or depth than the standard castle nut, and a corresponding reduction in the amount of stock used, without any sacrifice of strength.

In order that my invention and its inherent advantages and economies may be better understood by persons skilled in the art I have illustrated the same in the accompanying drawings in which—

Fig. 1 is a front elevation of a bolt, castle nut, and cotter-pin embodying the principle of my invention;

Fig. 2 is a side elevation of the same, in axial section through the nut and a portion of the bolt, with the cotter-pin omitted.

Fig. 3 is a section of the nut taken on the line B—B of Fig. 1; and

Figs. 4 and 5 are views showing the developed areas of the threads of the nut and corresponding threads of the bolt engaged by the nut.

Referring to the drawings, 10 designates a nut which may be assumed to be a nut of any standard size. Across one face of this nut are formed radial slots 11, 12, 13, 14, 15 and 16, and it will be observed that these slots extend through those portions of the wall of the nut which are of maximum thickness; that is, the longitudinal planes through the transverse centers of the slot bisect the corners of the periphery of the nut. It will further be noted that, in the construction shown, the bottom walls of the slots are concave and substantially semi-circular in cross-section, the purpose of which will be hereinafter disclosed.

21 designates the bolt, in usual form except that my invention enables the same to be made somewhat shorter than when employed with a standard castle nut. In the bolt is formed the usual transverse hole 20 to receive the cotter-pin 22 that also engages diametrically opposed slots of the nut; the slots being of considerably greater depth than the diameter of the hole 20 to afford the usual degree of adjustment of the nut lengthwise of the bolt while preserving the locking co-operation of the cotter-pin and nut and bolt.

By reference to Fig. 3 it will be observed that the area of the radial cross-section through the unslotted portion of the corner of the nut, shown on the left side of the figure, is no less than, and preferably substantially equal to, that of a radial cross-section through the wall of the nut between the bore and a point in the periphery midway between adjacent corners, shown at the right of the figure. Moreover, since, if the bottoms of the slots were flat, the former cross-section would gradually decrease in area from the center to the sides of the slot on account of the gradual reduction in the thickness of the wall at these points, I preferably form the slots with rounded concave bottom walls, whereby the gradual reduction in thickness is compensated by a corresponding increase in height between the planes of the center and side walls of the slot, so that the cross-sectional area of the unslotted portion is substantially constant throughout the full width of the slots; and this, as previously stated, is substantially equal to the cross-sectional area of the wall in a radial plane midway between adjacent corners. It is further noted that the walls of the nut are so thin (to avoid unnecessary thickness in relation to the bolt) that the last-named cross-section is of insufficient area and cohesive strength in relation to the diameter of the bore of the nut, or of the diameter of the bolt which it engages, to permit of reduction by slotting.

The slotted portion of the nut may be turned down, as shown, to form a usual circular flange corresponding to the added flange of the standard castle nut, whereby my improved castle nut does not require any greater length of cotter-pin than the standard castle nut; and manifestly this does not reduce the cross-sectional areas above-referred to and consequently does not reduce the strength of the nut to resist rupture.

By reference to Figs. 4 and 5 which illustrate developed thread portions of the nut and corresponding thread portions of the bolt engaged therewith, it will be seen that the shearing area at the base of the threads of the nut as shown in Fig. 4 is substantially equal to the shearing area at the base of the threads of the bolt, and thus the provision of the slots in the nut does not reduce the shear resisting strength of the structure which manifestly is no greater than the shear resisting strength of that portion of the threads of the bolt engaged by the nut.

From the foregoing it is manifest that by my invention a structure is provided wherein a substantial reduction in the length or depth of a castle nut, and a consequent saving of material, are effected without any reduction of the cohesive strength of the nut, and whereby also the bolt may be correspondingly shortened, with a corresponding saving in the material of the bolt.

Having thus described the invention what I claim and desire to cover by Letters Patent is:

1. The combination with a bolt formed with a transverse hole, of a polygonal nut formed with radial slots in one face thereof intersecting the corners of the periphery, and a cotter-pin engaged with said slots and hole, said slots being of a depth such that a radial cross-section through the unslotted portion of a corner of the nut is substantially equal in area to a radial cross-section through the wall of the nut between the bore and a point in the periphery midway between adjacent corners.

2. The combination with a bolt formed with a transverse hole, of a polygonal nut formed with radial slots in one face thereof intersecting the corners of the periphery, and a cotter pin engaged with said slots and hole; said slots having a uniform depth such that the unslotted portion of a corner has a strength not less than that of the weakest cross-section of the wall of the nut.

3. The combination with a bolt formed with a transverse hole, of a polygonal nut formed with radial slots in one face thereof intersecting the corners of the periphery, and a cotter-pin engaged with said slots and hole; said slots having transversely concave bottoms and being of a depth such that a cross-section through the unslotted portion of a corner at any point between the planes of the side walls of the slot is substantially equal in area to a radial cross-section through the wall of the nut between the bore and a point in the periphery midway between adjacent corners; the slotted portion of said nut being turned down to the form of a circular flange of uniform thickness equal to the thickness of the wall of the nut midway between adjacent corners.

4. A polygonal nut formed with radial slots across one face thereof intersecting the corners of the periphery and adapted to be engaged by a cotter pin, said slots being of uniform depth from end to end, said depth being greater than the diameter of the cotter-pin and such that a radial cross-section through the unslotted portion of a corner is at least equal to a radial cross-section through the wall of the nut between the bore and a point in the periphery midway between adjacent corners.

5. A polygonal nut formed with radial slots across one face thereof intersecting the corners of the periphery and adapted to be engaged by a cotter-pin, said slots having transversely concaved bottoms and being of uniform depth from end to end, said depth being greater than the diameter of the cotter-pin and such that a cross-section through the unslotted portion of a corner at any point between the planes of the side walls of the slot is at least equal in area to a radial cross-section through the wall of the nut between adjacent corners, whereby the wall of the nut possesses approximately uniform cohesive strength at all cross-sectional points thereof.

6. A polygonal nut having radial slots cut through the corners thereof to such a depth that a cross-section through the remaining unslotted portions of opposite corners is at least equal in area to a cross-section through the thinnest portions of opposite walls; said last-named cross-section being of insufficient area in relation to the diameter of the bore of the nut to permit of reduction by slotting.

In witness whereof, I hereunto subscribe my name this 2nd day of September A. D., 1922.

HENRY J. CHILTON.